United States Patent
Omnes et al.

(10) Patent No.: US 10,305,857 B2
(45) Date of Patent: May 28, 2019

(54) TECHNIQUE FOR OBTAINING A POLICY FOR ROUTING REQUESTS EMITTED BY A SOFTWARE MODULE RUNNING ON A CLIENT DEVICE

(71) Applicant: Orange, Paris (FR)

(72) Inventors: Nathalie Omnes, Trebeurden (FR); Emile Stephan, Pleumeur Bodou (FR); Romuald Corbel, Ploubezre (FR)

(73) Assignee: ORANGE, Paris (FR)

( * ) Notice: Subject to any disclaimer, the term of this patent is extended or adjusted under 35 U.S.C. 154(b) by 180 days.

(21) Appl. No.: 15/313,929

(22) PCT Filed: May 26, 2015

(86) PCT No.: PCT/FR2015/051378
§ 371 (c)(1),
(2) Date: Nov. 23, 2016

(87) PCT Pub. No.: WO2015/181484
PCT Pub. Date: Dec. 3, 2015

(65) Prior Publication Data
US 2017/0195290 A1    Jul. 6, 2017

(30) Foreign Application Priority Data

May 28, 2014    (FR) ..................... 14 54875

(51) Int. Cl.
*H04L 29/06*     (2006.01)
*H04L 12/725*    (2013.01)
*H04L 12/24*     (2006.01)

(52) U.S. Cl.
CPC ...... *H04L 63/0236* (2013.01); *H04L 41/0893* (2013.01); *H04L 45/306* (2013.01);
(Continued)

(58) Field of Classification Search
CPC .... H04L 63/0236; H04L 63/20; H04L 63/205
See application file for complete search history.

(56) References Cited

U.S. PATENT DOCUMENTS

| 6,772,225 B1* | 8/2004 | Jennings, III ..... G06F 17/30902 707/999.006 |
| 2003/0003932 A1* | 1/2003 | Corrigan ........... H04L 29/12066 455/466 |

(Continued)

FOREIGN PATENT DOCUMENTS

| EP | 2475142 A1 | 7/2012 |
| WO | WO 2011/087223 A2 | 7/2011 |

OTHER PUBLICATIONS

International Search Report dated Sep. 7, 2015 from PCT/FR2015/051378.
(Continued)

*Primary Examiner* — David J Pearson
(74) *Attorney, Agent, or Firm* — Knobbe, Martens, Olson & Bear, LLP (57) ABSTRACT

One embodiment relates to a method for obtaining, in a communication network, a routing policy indicating rules for routing requests emitted by a software module running on a client device. The method comprises sending, by the client device, a connection request to an authentication server of the communication network in order to attach the client device to the communications network- and receiving, by the client device, a connection context response from the authentication server. The context comprises an identifier of a system for managing routing rules. The software module obtains the routing policy in accordance with at least one first rule for routing to a proxy system certified by the operator of the communications network obtained by means of the identifier.

14 Claims, 5 Drawing Sheets

(52) U.S. Cl.
CPC ...... *H04L 63/0281* (2013.01); *H04L 63/0823* (2013.01); *H04L 63/0876* (2013.01); *H04L 63/20* (2013.01)

(56) References Cited

U.S. PATENT DOCUMENTS

| | | | | |
|---|---|---|---|---|
| 2009/0164560 A1* | 6/2009 | Fiatal | ................ | G06F 17/30905 709/203 |
| 2009/0171969 A1* | 7/2009 | Ristock | ............ | G06F 17/30566 |
| 2011/0154477 A1* | 6/2011 | Parla | .................. | H04L 63/0272 726/15 |
| 2012/0026933 A1* | 2/2012 | Aso | .................... | H04L 12/5692 370/315 |
| 2013/0021968 A1* | 1/2013 | Reznik | ................. | H04L 45/245 370/328 |
| 2014/0040504 A1* | 2/2014 | Gupta | .................... | H04W 4/70 709/244 |
| 2015/0365878 A1* | 12/2015 | Cho | ..................... | H04W 40/12 370/254 |

OTHER PUBLICATIONS

Belshe, M., "HTTP/2—Hypertext Transfer Protocol version 2", Internet Draft, Apr. 3, 2014, p. 1-79.
Gauthier, Paul, "Web Proxy Auto-Discovery Protocol", Internet Draft, Jul. 28, 1999, p. 1-18.
Loreto, S., "Explicitly Authenticated Proxy in HTTP/2.0", Internet Draft, May 5, 2014, p. 1-16.
Dierks, T., "The Transport Layer Security (TLS) Protocol", Internet Draft, Aug. 2008, p. 1-104.
Cooper, D., Internet X.509 Public Key Infrastructure Certificate and Certificate Revocation List (CRL) Profile, May 2008, p. 1-151.
Translation of the Written Opinion of the International Searching Authority dated Nov. 29, 2016 for International Application No. PCT/FR2015/051378 filed May 26, 2015, 7 pages.

* cited by examiner

TECHNIQUE FOR OBTAINING A POLICY FOR ROUTING REQUESTS EMITTED BY A SOFTWARE MODULE RUNNING ON A CLIENT DEVICE

RELATED APPLICATIONS

This application is the U.S. National Phase of Application No. PCT/FR2015/051378 entitled "TECHNIQUE FOR OBTAINING A POLICY FOR ROUTING REQUESTS EMITTED BY A SOFTWARE MODULE RUNNING ON A CLIENT DEVICE" filed May 26, 2015, which designated the United States, and which claims the benefit of French Application No. 1454875 filed May 28, 2014.

The invention is based in the field of packet communication networks and more particularly concerns a technique for obtaining a policy for routing requests transmitted by a software module running on a client device.

It is common for an operator of a communication network to use proxy servers in its network in order to offer its subscribers value added services provided by the operator itself or by a partner of the operator. These proxy servers make it possible to analyze and enhance a request relating to a service transmitted by a software module called a "user agent" (e.g. a browser) installed on a client device, or from an apparatus allowing connection to the Internet. By way of example, analysis of the request is implemented using a technique called Deep Packet Inspection (DPI), and enhancement of said request is implemented by adding one or more HTTP, for "HyperText Transfer Protocol", parameters. By way of example, this enhanced request allows a service provider to provide functions such as parental control, geolocalized services or personalization of the service delivered on the basis of a subscription type of the subscriber. Proxy servers particularly allow traffic for the operator, for a partner of the operator or for a third party to be distinguished.

The next version of the HTTP protocol, "HTTP 2.0", currently under discussion in the working group "Hypertext Transfer Protocol Bis" (or httpbis) of the IETF, "Internet Engineering Task Force", implements functions that complicate the analysis and enhancement of requests relating to a service that are transmitted from a browser, for example. The HTTP 2.0 protocol particularly allows multiplexing of interchanges, interlacing of these interchanges, compression of the headers relating thereto, and also provision of security therefor using the TLS, "Transport Layer Security", protocol. These new functions require processing adapted by the network operator in order to ensure continuity of the value added services offered to its subscribers. The network operator accomplishes this by associating a proxy apparatus with one or more services, offered by the operator itself or a service provider, to which services requests relating to one of these services are routed. This association is not always complied with, however. The reason is that the routing of these requests to the proxy apparatus associated with a service may not be taken into account, since the requests for this service can be redirected by a browser to another proxy apparatus. This can particularly cause routing to a proxy apparatus that is unsuited to processing of the requested service. The absence of analysis and/or enhancement of the request relating to the service requested by a proxy apparatus in charge of controlling requests for the service can particularly result in problems with service-related billing (e.g. billing for a free service), degradation of the service requested or subscribed to by a subscriber, or the inability of the operator or service provider to deliver the service.

The document "draft-loreto-httpis-explicitly-auth-proxy-00.txt" from the IETF proposes a method allowing a software module to automatically discover an explicitly authenticated proxy apparatus. The proposed method moreover allows a user of the software module to explicitly give his agreement as regards routing, by means of the explicitly authenticated proxy apparatus, of HTTP requests transmitted from this software module. More precisely, the proxy apparatus indicates its presence to the software module when parameters relating to a TLS connection are negotiated. The proxy apparatus intercepts a TLS "ClientHello" message and responds to this message with a TLS "ServerHello" message comprising a certificate of the proxy apparatus. The software module checks whether the certificate belongs to a proxy apparatus using a particular field of the certificate, and then satisfies itself of the consent of the user to the routing of the HTTP requests transmitted by the software module to this proxy apparatus. It is emphasized that the solution proposed in this document requires a particular type of certificate in order to authenticate the proxy apparatus. This solution moreover requires the proxy apparatus to intercept a specific TLS message and to modify the response to this message. The document also mentions the possibility of a client device discovering the presence of a proxy apparatus before a TLS connection is set up, when the client device is attached to the network, without, however, providing any indications regarding the methods that allow this discovery of the proxy apparatus.

One of the aims of the invention is to overcome inadequacies/disadvantages of the prior art and/or to make improvements thereto.

According to a first aspect, the invention concerns a method for obtaining, in a communication network, a routing policy indicating rules for routing requests transmitted by a software module running on a client device. The method comprises the following steps, implemented when the client device is attached to the communication network:
  the client device sending, to an authentication server of the communication network, a connection context request in order to attach the client device to the communication network;
  the client device receiving, from the authentication server, a connection context response, said context comprising an identifier of a routing rule management apparatus;
  the software module obtaining the routing policy, from at least one first rule for routing to a proxy apparatus certified by the operator of the communication network, said rule being obtained by means of the identifier.

The implementation of the method when the client device is attached to the communication network makes it possible to guarantee that requests transmitted by the software module are not sent or diverted to a proxy apparatus not approved by the operator of the communication network. As the identifier of the apparatus for managing routing rules is provided by the communication network even before a connection context is activated between the client device and the communication network, and therefore before an address has been allocated to the client device in the communication network, no third party is actually able to intervene before the end of the attachment procedure. The method thus makes it possible to provide security for the obtainment of the routing policy and to guarantee that the latter comes from a reliable source. Moreover, the method makes it possible to protect a service provider from a security problem related to routing of a request to an apparatus in a network that is capable of malice on the content of the request or toward the service provider. It particularly makes it possible to ensure a safe journey for requests transmitted by the software module.

As diversion of requests transmitted by the software module is avoided, it is moreover possible for the operator of the communication network to ensure the continuity of value added services offered for these requests.

The method moreover makes it possible to prevent a subscriber of the operator of the communication network from having a degraded user experience owing to inappropriate routing of requests transmitted by the software module.

Furthermore, sending an identifier of the routing rule management apparatus with the connection context makes it possible to limit network interchanges necessary for discovering this apparatus by the software module. In particular, no specific IP (Internet Protocol) message is necessary in order to obtain this identifier. As the identifier of the routing rule management apparatus is provided by the authentication server on attachment of the client device to the communication network, no interception of the messages transmitted by the software module is necessary in order for the management apparatus to be able to indicate its presence to the client device. The identifier is particularly provided in the connection context as a parameter. Implementation of the invention in the communication network is thus facilitated.

According to a particular feature, the obtainment method moreover comprises the following steps implemented by the software module, prior to the obtainment of the routing policy:

setting up a secure connection to the routing rule management apparatus;

using the secure connection to receive at least one certificate associated with the routing rule management apparatus.

The first routing rule is furthermore determined from at least one resource identifier included in the received certificate.

The method makes it possible to certify the recipient resources of the requests transmitted by the software module and the routing rule management apparatus with one and the same certificate. Obtaining the identifier of the routing rule management apparatus particularly does not require prior setup of a secure connection (e.g. connection of TLS type) to these resources in order to authenticate them. Obtaining a minimal routing policy from the first routing rule can thus be accomplished rapidly. Similarly, rapidly obtaining the routing policy allows a decrease in response times for requests transmitted by the software module, and increase in the quality of service relating to processing operations for these requests.

Moreover, the certificate defines identifiers of resources to which the first routing rule applies. By way of example, these resources are physical apparatuses in a communication network or services (e.g. content distribution service, printing service, web service) provided by these apparatuses. It thus makes it possible to define a minimal routing policy on the basis of resource identifiers for which requests are transmitted by the software module. This minimal routing policy advantageously consists in routing all requests relating to a defined resource in the certificate to the routing rule management apparatus. By way of example, this management apparatus is managed by the operator of the communication network. The routing policy obtained from the first routing rule thus makes it possible to route requests relating to services provided by service providers partnering the operator of the communication network to the routing rule management apparatus. The routing rule management apparatus can thus implement value added functions on requests to service providers for which there is an agreement to enhance these requests with the operator of the communication network, for example.

A routine policy defined from the resource identifiers included in the certificate received by the software module also makes it possible to limit the scope of the first routing rule just to the resources declared in the certificate.

The routing of requests on the basis of resources declared using the certificate particularly prevents a service provider from receiving requests that do not pertain to its competence or a resource for which it acts through delegation.

According to a particular feature, the obtainment method comprises obtaining a second rule for routing to a third-party proxy apparatus. The routing policy is then obtained by combining the first and second routing rules.

By way of example, the second routing rule is obtained from the routing rule management apparatus. It makes it possible to complement the first routing rule. This second routing rule is advantageously obtained from a third-party proxy apparatus of a service provider partnering the operator of the communication network. The routing policy resulting from the combination of the first and second routing rules particularly makes it possible for the client device to interconnect with multiple proxy apparatuses. By way of example, these proxy apparatuses belong to the various service providers partnering the operator of the communication network. More generally, the routing policy makes it possible to route requests relating to a resource or to a service to a proxy apparatus suited to processing them.

The method thus allows service providers to pool their respective routing rules in one and the same routing policy. It is recalled that, according to techniques known from the prior art, a software module running on a client device can receive only one routing policy at a time. The method means that multiple routing rules from different service providers can thus be combined with one another in order to form a routing policy that takes into account routing constraints for each of these providers.

Obtaining the routing policy by combining routing rules managed by third-party proxy apparatuses of different service providers moreover has the advantage for the software module that it has only a single consolidated routing policy to process. Combination of the rules into a single routing policy also makes it possible to present the software module with a set of coherent, optimized rules and to avoid rule redundancy. The processing of the routing rules by the software module is thus speeded up.

According to a particular feature, the obtainment of the second routing rule and the combination of the first and second routing rules are implemented by the software module running on the client device.

The obtainment and combination of the routing rules by the software module make it possible to manage the coexistence of routing rules directly on the client device, without an apparatus of the communication network and a third-party proxy apparatus needing to interconnect with one another. It is thus not necessary to allocate resources of the communication network in order to aggregate routing rules.

According to a particular feature, the obtainment method moreover comprises, when the first and second routing rules are in conflict, a step of sending a piece of information relating to the conflict to the routing rule management apparatus.

The client device sending a piece of information relating to the conflict to the routing rule management apparatus makes it possible to inform the latter of the solution accepted, if need be, by the client device in order to resolve the conflict. When the conflict cannot be resolved by the client device, the information relating to the conflict that is transmitted to the routing rule management apparatus allows the latter to draft a new routing policy in order to attempt to resolve the conflict.

According to a particular feature, the obtainment of the second routing rule and the combination of the first and second routing rules are implemented by the routing rule management apparatus.

The obtainment and combination of the routing rules by the routing rule management apparatus allow the software module to be relieved of the computation load necessary for consolidating the routing rules. This is particularly advantageous when the computation resources of the client device on which the software module is running are limited.

Moreover, centralized management of the routing rules by the routing rule management apparatus facilitates maintenance and update of these rules. Such centralized management also makes it possible to provide the routing rule management apparatus with accreditation functions, on behalf of service providers, for the routing policy obtained from the routing rules implemented by proxy apparatuses managed by these providers.

According to a second aspect, the invention concerns a method, in a communication network, for assisting in obtaining a routing policy indicating rules for routing requests transmitted by a software module running on a client device, the method comprising the following steps, implemented when the client device attaches to the communication network:
    an authentication server receiving, from the client device, a connection context request in order to attach the client device to the communication network;
    an authentication server sending, to the client device, a connection context response, the context comprising an identifier of a routing rule management apparatus.

The advantages stated for the method for obtaining a routing policy according to the first aspect also apply to the method for assisting in obtaining a routing policy according to the second aspect.

According to a third aspect, the invention also concerns a client device designed to obtain an identifier of a routing rule management apparatus, the client device comprising:
    a sending module designed to send a connection context request to an authentication server in order to attach the client device to a communication network;
    a module for receiving a connection context response, the context comprising an identifier of a routing rule management apparatus;
    a processing module designed to obtain a routing policy intended to be used by the client device, by means of the identifier of the apparatus.

According to a fourth aspect, the invention proposes an authentication server, in a communication network, designed to assist a client device in obtaining a routing policy, comprising:
    a receiving module designed to receive a connection context request in order to attach the client device to the communication network;
    a sending module designed to send a connection context response, the context comprising an identifier of a routing rule management apparatus;
    a processing module configured to insert the identifier of the apparatus into a connection context response intended for a client device, following reception of a connection context request from this client device.

According to a fifth aspect, the invention concerns an obtainment system for a routing policy indicating rules for routing requests transmitted by a software module running on a client device, designed to provide the routing policy for the software module. The system comprises:
    the client device according to the third aspect;
    an authentication server according to the fourth aspect.

According to a particular feature, the system moreover comprises a routing rule management apparatus designed to manage routing rules, comprising:
    a receiving module designed to receive a request for a policy for routing requests transmitted by a software module running on a client device;
    a sending module designed to send the routing policy;
    a processing module designed to generate a routing policy intended to be used by a client device.

The advantages stated for any one of the features of the obtainment method according to the first aspect are directly transposable to the system according to the fifth aspect.

According to a sixth aspect, the invention also concerns a software module for a client device, comprising program code instructions intended to control the execution of the steps of the method for obtaining a routing policy as described above when said software module is executed by said client device, and a recording medium readable by a client device on which is recorded a software module for a client device.

According to a seventh aspect, the invention also concerns a program for an authentication server, comprising program code instructions intended to control the execution of the steps of the method for assisting in obtaining a routing policy as described above when said program is executed by said authentication server, and a recording medium readable by an authentication server on which is recorded a program for a server.

The invention will be better understood with the aid of the description below of particular embodiments, with reference to the appended drawings, in which.

Figure 1A:
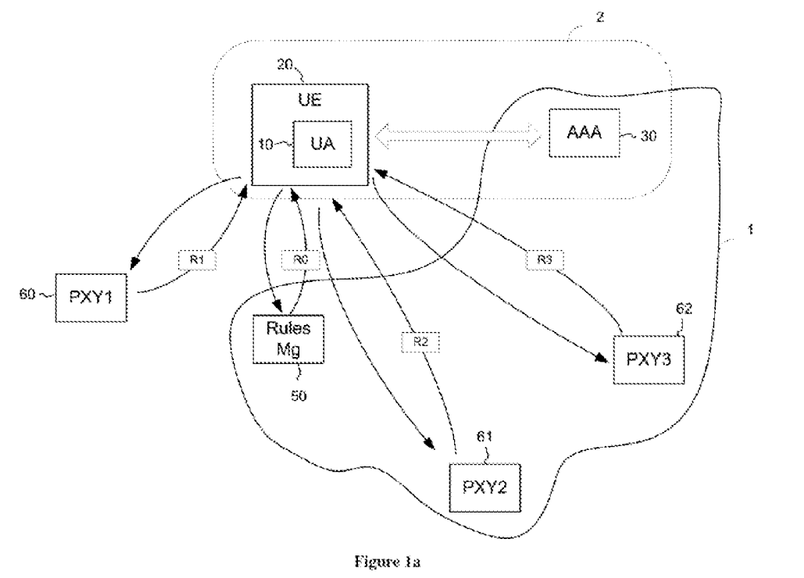
FIGS. 1a and 1b show a system for obtaining a routing policy according to two particular embodiments.
Figure 1B:
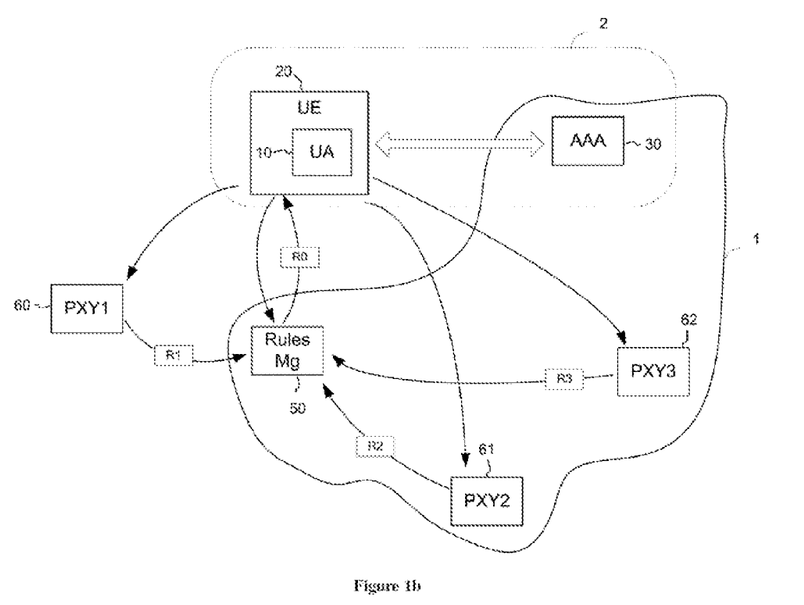

FIGS. 1a and 1b show a system 2 for obtaining, in a communication network 1, a policy for routing requests transmitted by a software module 10 running on a client device 20 according to two particular embodiments. By way of example, the communication network is a GPRS (General Packet Radio Service) network. The system 2 comprises the client device 20 on which the software module 10 runs and an authentication server 30. The client device 20 is a user terminal, for example (e.g. a cell phone, a portable computer, a tablet). By way of example, the software module 10 is a software application or a component of a software application executed by the operating system of the client device 20. It may particularly be any application allowing communication with a packet communication network, such as a browser, a messaging application or a piece of software transmitting requests of HTTP type. The authentication server 30 allows the client device 20 to authenticate itself and to attach itself to the communication network 1. The attachment to the communication network 1 is more particularly defined by the fact that the client device 20 obtains an IP (Internet Protocol) address allocated by the authentication server 30, allowing the client device 20 to be identified on the communication network 1. The authentication server 30 is a GGSN (Gateway GPRS Support Node) apparatus of the communication network 1, for example.

The system 2 communicates with a routing rule management apparatus 50. This apparatus 50 is managed (or possibly simply approved) by the operator of the communication network 1. In the embodiments described with reference to FIGS. 1a and 1b, the routing rule management apparatus 50 is located in the communication network 1. However, there is no restriction regarding the location of the routing rule management apparatus 50, which may thus also be located outside the communication network 1.

The system 2 allows a routing policy to be used to route the requests transmitted by the software module 10 to the routing rule management apparatus 50 and proxy apparatuses 60, 61 and 62. There are no restrictions regarding the location of the proxy apparatuses. By way of example, the proxy apparatus 60 is located outside the communication network 1, and the proxy apparatuses 61 and 62 are located inside the communication network 1. Nor is there any restriction regarding the entity responsible for administrating a proxy apparatus. By way of example, the proxy apparatus 61 is administrated by the operator of the communication network 1, and the proxy apparatus 62 is administrated by a service provider partnering the operator of the communication network 1. It is moreover emphasized that according to the particular embodiments described with reference to FIGS. 1a and 1b, the routing rule management apparatus 50 is also a proxy apparatus.

FIG. 1a provides a more precise description of a particular embodiment in which the routing policy is obtained by the client device 20 by combining routing rules R0, R1, R2 and R3 respectively obtained by the software module 10 from the proxy apparatuses 50, 60, 61 and 62.

In the particular embodiment described with reference to FIG. 1b, the routing rule management apparatus 50 centralizes routing rules R1, R2 and R3 respectively obtained from the proxy apparatuses 60, 61 and 62. The routing rule management apparatus 50 then combines these rules with its own routing rule R0 in order to draft the routing policy that it then provides for the software module 10.

Moreover, in the particular embodiments described with reference to FIGS. 1a and 1b, the obtainment method is implemented in a network of GPRS type, but there is no restriction regarding the network architecture in which the invention is implemented. By way of example, the method may also be implemented in a fixed network, a Wifi network or an optical fiber network.

Furthermore, in another embodiment, the client device 20 is not restricted to a user terminal. It may also be an apparatus providing access to the communication network 1, such as a home gateway.

Four proxy apparatuses are shown in FIGS. 1a and 1b, but there is no restriction regarding the number of proxy apparatuses from which the routing policy can be obtained. A routing policy is thus constituted either by a combination of multiple routing rules or by the only routing rule of the routing rule management apparatus 50. When the routing rule management apparatus 50 is managed by the communication network 1, this routing rule then constitutes the default rule of the operator of the communication network 1.

Figure 2A:
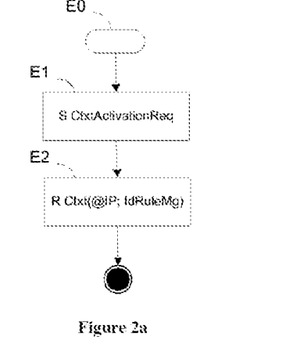
FIG. 2a shows the steps of the method for obtaining a routing policy that is implemented by a client device according to a particular embodiment.

FIG. 2a shows the steps of the method for obtaining a routing policy implemented by a client device according to a particular embodiment.

Obtaining the routing policy requires prior obtainment of an identifier of the routing rule management apparatus 50 by the client device 20. The steps allowing this identifier to be obtained will now be described with reference to FIG. 2a. These steps are implemented by the client device 20.

In a step E0, the client device is in a neutral state awaiting a network event. This network event is a change of cell in the communication network 1, for example.

The method then moves to a step E1, of sending a connection context request to an authentication server of the communication network in order to attach the client device to the communication network 1. By way of example, the connection context is a PDP (Packet Data Protocol) context and the connection context request corresponds to the sending of a PDP Context Activation message, for example.

In response to the connection context request, the client device 20 receives, in a step E2, a connection context response comprising particularly an IP address allowing the client device 20 to be identified in the communication network 1, and an identifier of a routing rule management apparatus 50 storing a routing rule managed by the communication network 1. This identifier is, for example, an IP address, a URI of a "proxy.pac" configuration file, or a certificate (e.g. certificate based on the X.509 standard) of the routing rule management apparatus 50.

After this step E2, the parameters of the connection context are available to the software module 10 through the operating system of the client device 20, which provides it with them on request.

The client device 20 then moves to step E0, awaiting a next event triggering a connection context request.

In conjunction with the steps of obtaining a routing policy that are implemented by the client device 20, an authentication server 30 implements a method for assisting in obtaining the routing policy. This method will now be described with reference to FIG. 2b.

Figure 2B:
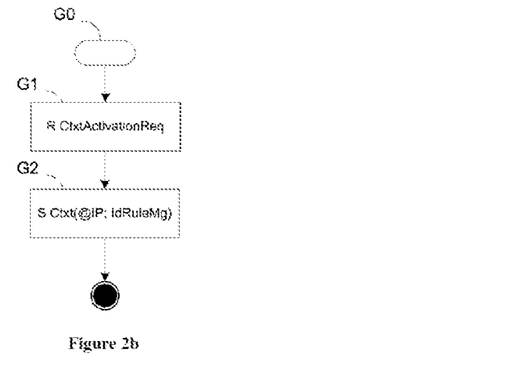
FIG. 2b shows the steps of a method for assisting in obtaining a routing policy that is implemented by an authentication server according to a particular embodiment.

In a step G0, the authentication server 30 is awaiting a connection context request.

In a step G1, the authentication server 30 receives a connection context request transmitted by the client device 20.

On receiving this connection context request, the authentication server 30 determines (steps not shown) the parameters that will be included in the connection context. By way of example, it interrogates a DHCP (Dynamic Host Configuration Protocol) server in order to obtain an IP address to be allocated to the client device 20. The authentication server 30 also determines an identifier of the routing rule management apparatus 50 and adds it to the parameters included in the connection context. In the same way as for obtainment of the IP address to be allocated to the client device, the identifier of the management apparatus can be obtained by interrogating a DHCP server. In another embodiment identifying it, a domain name or an IP address of the management apparatus 50, for example, is configured locally by the authentication server 30. There is no restriction regarding the obtainment of this identifier by the authentication server. When the identifier is a domain name of the management apparatus 50, a step of interrogating a DNS (Domain Name System) server can also optionally be implemented in order to obtain an IP address of the management apparatus 50.

In a step G2, when all of the parameters of the connection context have been determined, the authentication server 30 sends, for example using an SGSN (Serving GPRS Support Node) apparatus, the context of the client device 20. By way of example, the connection context is communicated to the client device 20 using the NAS (Non-Access Stratum) protocol.

The authentication server 30 then moves to step G0 awaiting a new connection context request.

Figure 2C:
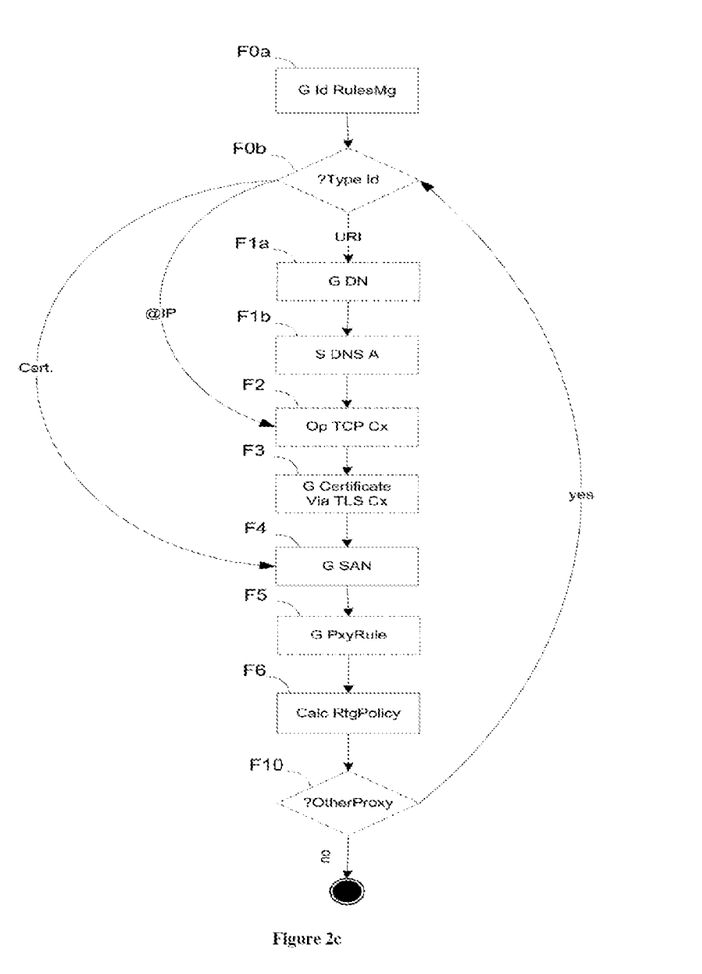
FIG. 2c shows the steps of the method for obtaining a routing policy that is implemented by a software module running on a client device according to a particular embodiment.

FIG. 2c shows the steps of the method for obtaining, in a communication network 1, a routing policy implemented by a software module 10 running on a client device 20 according to a particular embodiment.

In a step F0a, the software module 10 interrogates the operating system of the client device 20 in order to obtain the identifier of the routing rule management apparatus 50.

In a step F0b, the software module 10 checks the type of identifier obtained for the routing rule management apparatus 50. By way of example, the identifier obtained is a URI (Uniform Resource Identifier) "https://proxy.myisp.fr/proxy.pac".

In a step F1a, the software module extracts a domain name from the URI obtained in step F0b. The domain name extracted is "proxy.mysip.fr", for example.

In a step F1b, the software module 10 then interrogates a DNS server on the basis of the domain name "proxy.myisp.fr". This interrogation more particularly corresponds to a type-A DNS resolution request on the domain name "proxy.mysip.fr" allowing a type-A DNS recording as defined in an IETF document RFC 1035 to be obtained. In response, the software module 10 obtains an IP address of the routing rule management apparatus 50.

In a step F2, the software module 10 sets up a TCP (Transmission Control Protocol) connection to the routing rule management apparatus 50 by means of the IP address of the latter.

In a step F3, the software module 10 obtains a certificate of the rule management apparatus 50. For this, the software module 10 initializes setup of a TLS (Transport Layer Security) connection by sending a TLS ClientHello message to the management apparatus 50, and then receives in return a TLS ServerHello message comprising a certificate associated with the rule management apparatus 50.

In a step F4, the software module 10 analyzes the certificate obtained in order to identify an SAN (Subject alt name) field. This field particularly comprises resource identifiers as defined in chapter 4.2.1.6 of the document RFC 5280 from the IETF. These identifiers are an IP address, a domain name or a URI, for example. By way of example, the SAN field comprises the following domain names: "proxy.isp.fr", "isp.sp.fr". The software module 10 then checks that the domain name associated with the routing rule management apparatus 50 is included in the domain names of the SAN field. The presence of the domain name "proxy.isp.fr" among the domain names of the SAN field particularly allows the authenticity of the certificate associated with the routing rule management apparatus 50 to be guaranteed. Still in this step F4, the software module 10 determines a first routing rule R0a to the requests transmitted by the latter. This first routing rule takes into account the resource identifiers declared in the certificate associated with the routing rule management apparatus 50. In the embodiment described, these identifiers are the domain names "proxy.isp.fr", "isp.sp.fr". This first routing rule thus imposes the routing of all of the requests transmitted by the software module 10 that relate to one of these domain names to the routing rule management apparatus 50. It particularly makes it possible to ensure that a user of the mobile client device 20 on which the software module 10 runs sees a safe journey for the requests transmitted by the software module 10 to one of these domain names. This routing rule R0a moreover guarantees that these requests will not pass through a proxy apparatus not authenticated by the communication network 1.

In a step F5, the software module 10 interrogates the routing rule management apparatus 50 in order to obtain a second routing rule R0b. In contrast to the first routing rule R0a, the second routing rule comprises sub-rules for filtering and routing the requests transmitted by the software module 10 to proxy apparatuses not necessarily authenticated by the communication network 1. By way of example, the second routing rule R0b takes the form of a configuration file known from the prior art called "proxy.pac" or "wpad.dat".

In a step F6, the software module 10 combines the first and second routing rules R0a and R0b. It then obtains a routing policy specifying how the software module accesses resources identified by a URI. More precisely, the software module 10 obtains the routing policy from at least the first rule for routing to a proxy apparatus certified by the operator of the communication network 1, by means of the identifier obtained by the client device 20 when it attaches to the communication network 1.

Finally, in a step F10, the software module 10 checks whether other routing rules can be obtained from third-party proxy apparatuses. According to the techniques known from the prior art, these routing rules are obtained, by way of example, through configuration of an IP address of a proxy apparatus by the software module 10, through configuration of a URI indicating a proxy apparatus from which a "proxy.pac" file can be obtained, or through discovery of a "proxy.pac" file using the WPAD (WEB Proxy Auto Discover) protocol. Steps F0b to F6 are then repeated in order firstly to authenticate the proxy apparatus and secondly to obtain a new routing policy through a combination of all of the routing rules obtained.

In another embodiment, the identifier of the routing rule management apparatus 50 obtained by the software module 10 in step F0a is still of the same type. Step F0b is then not implemented.

In another embodiment, in which the identifier of the routing rule management apparatus 50 is an IP address, steps F1a and F1b are not implemented. The software module 10 directly sets up a TCP connection to the routing rule management apparatus 50. No DNS interrogation is necessary in order to obtain the routing policy from the first routing rule.

In another embodiment, in which the identifier of the routing rule management apparatus 50 is constituted by a certificate associated with the apparatus under consideration, steps F1a to F3 are not implemented. In step F4, the software module 10 directly checks, by means of the SAN field of the certificate, whether the routing rule management apparatus 50 discovered during the attachment of client device 20 to the communication network 1 is authenticated by the communication network 1. Obtaining the routing policy thus requires neither DNS interrogation nor setup of a TLS connection.

In another embodiment, the obtainment of the second routing rule and the combination of the first and second routing rules are implemented by the routing rule management apparatus 50. Steps F2 to F6 are then implemented by the routing rule management apparatus 50. This embodiment will be described later with reference to FIG. 3b.

In another embodiment, when a conflict occurs when the routing rules are combined in step F6, the software module 10 sends a piece of information relating to this conflict to the routing rule management apparatus 50. Such a conflict can particularly arise when different rules are applied to one and the same type of requests (e.g. requests relating to one and the same domain name) transmitted by the software module 10. The information relating to the conflict is constituted by all of the rules for which a conflict exists, for example. It may also be an identifier of a proxy apparatus selected by the software module 10 in order to resolve the conflict. When the combination of the routing rules is implemented by the routing rule management apparatus 50, the latter can then take into account this information relating to the conflict in order to draft a new routing policy.

Finally, in another embodiment, in which a minimal routing policy is obtained, step F5 is not implemented. The routing policy then simply corresponds to the first routing rule obtained in step F4.

Figure 3A:
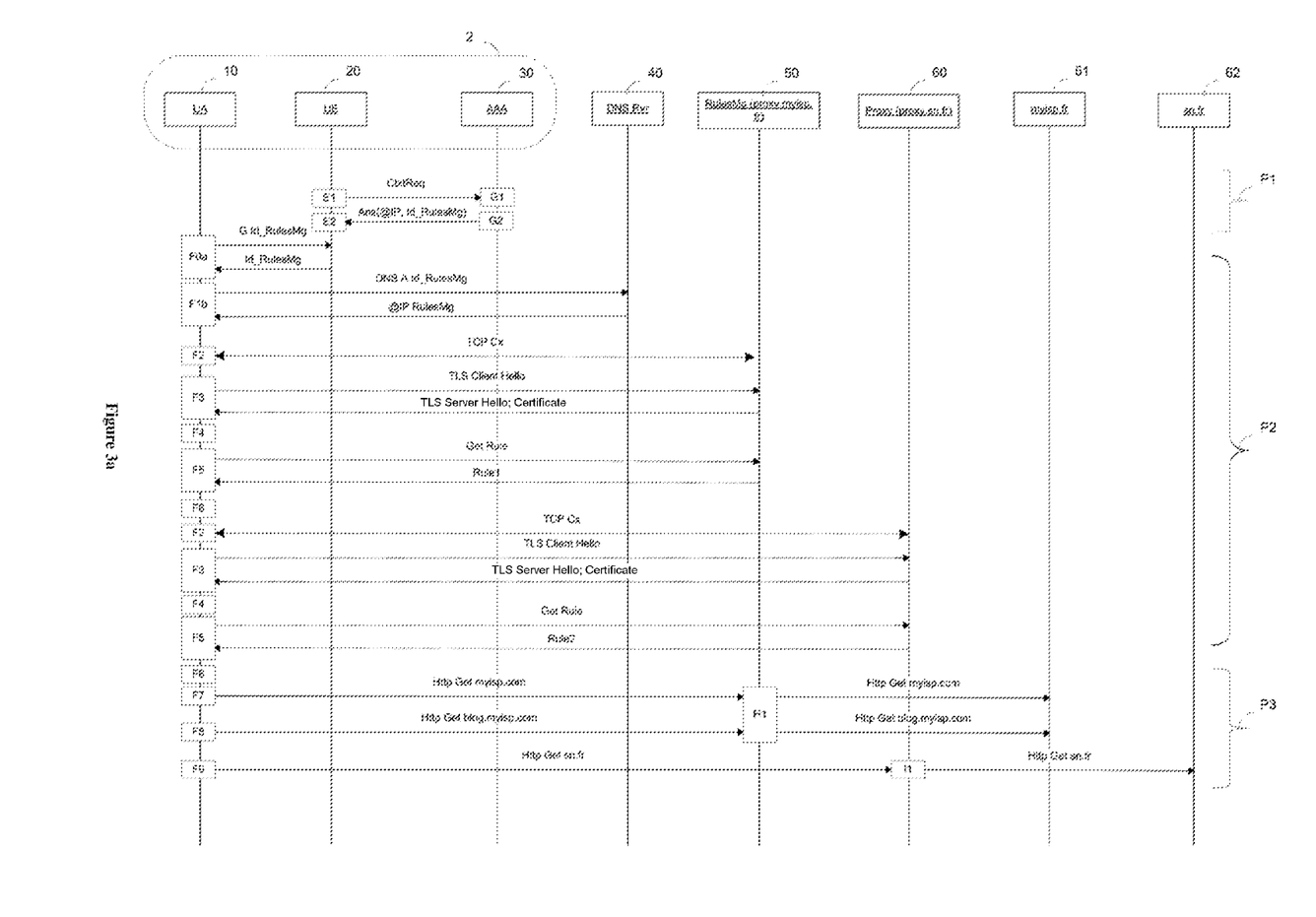
FIGS. 3a and 3b show interchanges between apparatuses implementing the methods for obtaining and assisting in obtaining a routing policy, apparatuses of the communication network and third-party proxy apparatuses according to two particular embodiments.
Figure 3B:
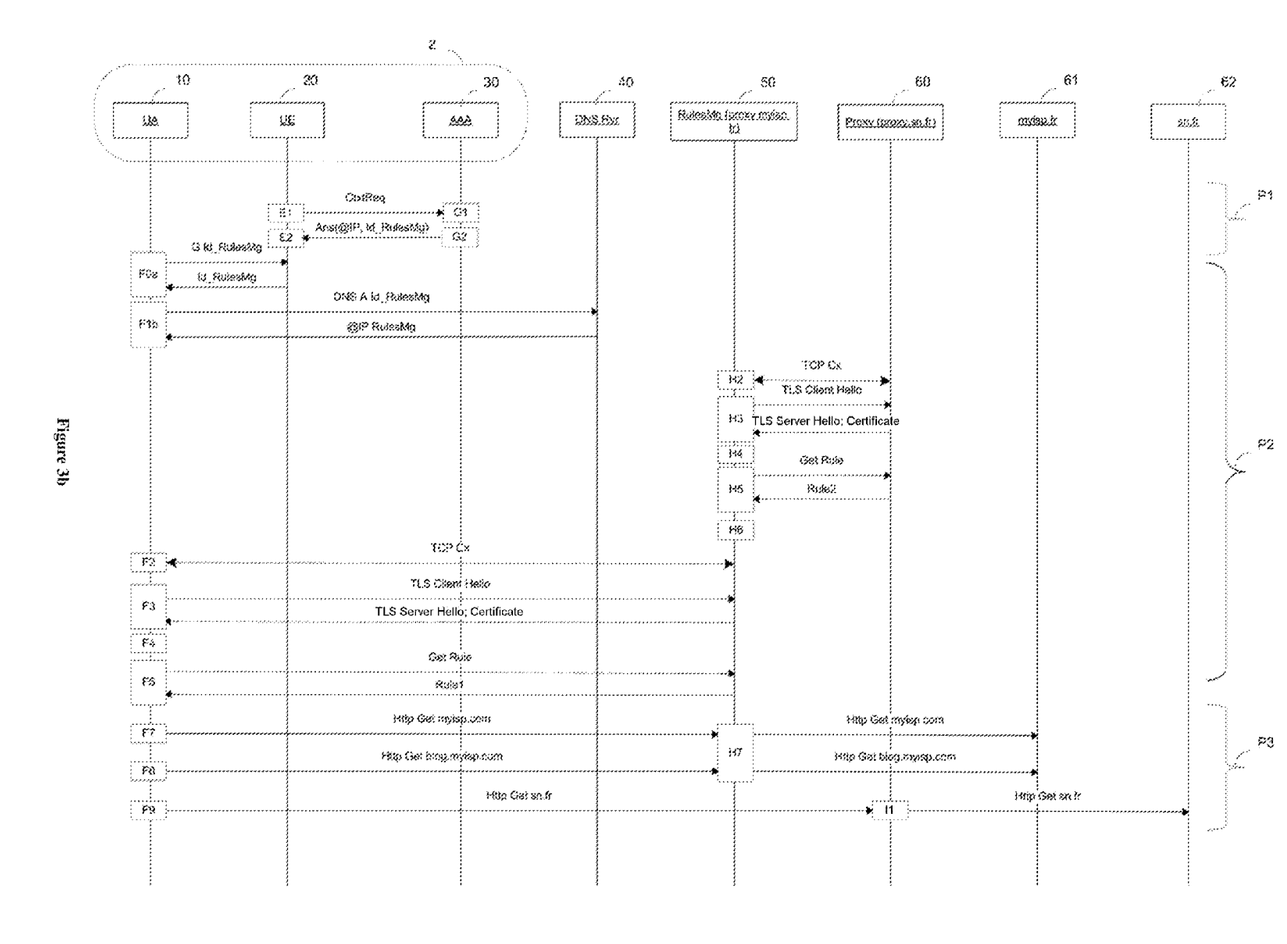

FIGS. 3a and 3b show interchanges between apparatuses implementing the methods for obtaining and assisting in obtaining a routing policy, apparatuses of the communication network and third-party proxy apparatuses according to two particular embodiments.

Three phases P1, P2 and P3 are described, in particular. The phase P1 corresponds to the obtainment of an identifier of the routing rule management apparatus 50 when a client device 20 attaches to the communication network 1. The phase P2 corresponds to the drafting and obtainment of a policy for routing the requests transmitted by the software module 10 from a first routing rule obtained by means of the identifier of the routing rule management apparatus 50. The phase P3 corresponds to the implementation of the routing policy by the software module 10.

FIG. 3a more particularly describes an embodiment in which the obtainment of the second routing rule and the combination of the first and second routing rules are implemented by the software module 10.

In the phase P1, the client device 20 sends a connection context request to the authentication server 30 in a step E1. In response, the authentication server 30 returns a connection context to it comprising an IP address to be allocated to the client device 20 and an identifier of the routing rule management apparatus 50. This identifier is the URI "https:\\proxy.myisp.fr", for example, and is received in a step E2.

The phase P2 then begins by virtue of the software module 10 obtaining, in a step F0a, the URI "https:\\proxy.mysip.fr" using the operating system of the client device 20.

On the basis of this URI, the software module 10 sends a DNS request A to a DNS server 40 in a step F1b, and obtains an IP address of the routing rule management apparatus 50.

The software module 10 sets up a TCP connection to the routing rule management apparatus 50 in a step F2.

It then sets up, also in a step F3, a TLS connection in the course of which it retrieves a certificate associated with the routing rule management apparatus 50. By way of example, this certificate contains a SAN field taking the following form:

"subjectaltname": "DNS:*.myisp.fr, DNS:*.cdn.fr"

In a step F4, the software module determines a first minimal routing rule R0a from the SAN field. In the example under consideration, the first minimal rule consists in routing all requests relating to the domain names "myisp.fr" and "cdn.fr" to the routing rule management apparatus 50 authenticated and discovered by the client device 20 when the client device attaches to the communication network 1.

In a step F5, the software module obtains a second routing rule R0b from the routing rule management apparatus 50 by means of the URI obtained by the client device in step E2. This second routing rule R0b is defined by the sub-rules contained in the "proxy.pac" file indicated by the URI "https:\\proxy.myisp.fr\proxy.pac". By way of example, this second routing rule R0b contains a sub-rule indicating routing of all requests from the software module 10 that relate to the domain name "vod.fr" to a proxy apparatus associated with the domain name "proxy.vod.fr".

Next, in a step F6, the software module combines the first and second routing rules into a single policy for routing to multiple certified proxy apparatuses.

If the routing rules proposed by third-party proxy apparatuses can be discovered by the software module 10 using URIs identifying "proxy.pac" configuration files, then steps F2 to F6 are repeated for each of these URIs. By way of example, these steps are repeated in order to check the authenticity of the certificate associated with the third-party proxy apparatus 60 and to obtain the routing rule stored by the latter. This latter routing rule consists in routing all requests relating to the domain name "sn.fr" by the proxy apparatus 60 associated with this domain name, for example. A new routing policy is then drafted in step F6 by combining routing rules from the previous routing policy with the recently obtained routing rule. When there is no other routing rule from a third-party proxy apparatus to be retrieved, the routing policy is complete and the phase P2 comes to an end. At the end of the phase P2, the routing policy obtained for the example under consideration therefore consists in routing all requests relating to the domain names "myisp.fr" and "cdn.fr" to the routing rule management apparatus 50, all requests relating to the domain name "vod.fr" to a proxy apparatus associated with the domain name "vod.fr", and all requests relating to the domain name "sn.fr" to a proxy apparatus 60 with the domain name "proxy.sn.fr".

Finally, in the phase P3, the routing policy obtained is implemented by the software module 10. By way of example, three requests "Http Get myisp.com", "Http Get blog.myisp.com" and "Http Get sn.fr" are transmitted by the software module 10 in steps F7, F8 and F9, respectively. Owing to the routing policy, the "Http Get myisp.com" and "Http Get blog.myisp.com" requests are routed to the routing rule management apparatus 50. The "Http Get sn.fr" request is for its part routed to the proxy apparatus 60.

In another embodiment with reference to FIG. 3b, the obtainment of the second routing rule and the combination of the first and second routing rules are implemented by the routing rule management apparatus 50. The phases P1 and P3 continue to be identical to the embodiment described with reference to FIG. 3a.

The obtainment and combination, in steps F2 to F6, of the routing rules as described with reference to FIG. 3a are then obtained in corresponding steps H2 to H6 implemented by the routing rule management apparatus 50.

The software module 10 sets up a TCP connection in step F2, and then a TLS connection in step F3, in the course of which it obtains a certificate associated with the routing rule management apparatus 50. The software module 10 then checks the authenticity of the certificate associated with the routing rule management apparatus 50 in step F4. Finally, the software module obtains the routing policy in step F5.

Figure 4:
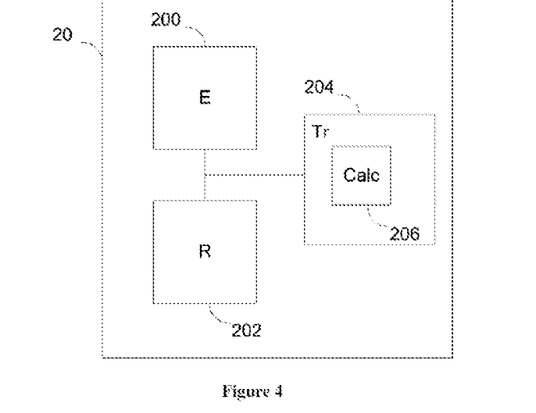
FIG. 4 shows a client device designed to implement steps of the method for obtaining a routing policy according to a particular embodiment.

A client device 20 designed to implement steps of the method for obtaining a routing policy according to a particular embodiment will now be described with reference to FIG. 4. Such a client device 20 is particularly designed to obtain an identifier of a routing rule management apparatus 50. The client device 20 particularly comprises:
- a sending module 200 designed to send a connection context request to an authentication server 30 in order to attach the client device 20 to a communication network 1;
- a module 202 for receiving a connection context response, the context comprising an identifier of a routing rule management apparatus 50;
- a processing module 204 designed to obtain a routing policy intended to be used by the client device 20, by means of the identifier of the apparatus 50.

In a particular embodiment, the processing module 204 drafts the routing policy from multiple routing rules that it has obtained from various sources, in which case it moreover comprises a computation module 206 designed to combine the routing rules obtained in this manner in order to draft the routing policy.

Figure 5:
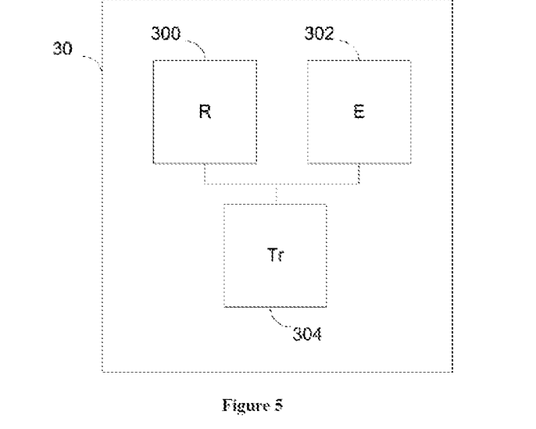
FIG. 5 shows an authentication server designed to assist a client device in obtaining a routing policy according to a particular embodiment.

FIG. 5 shows an authentication server 30 designed to assist a client device 20 to obtain a routing policy. The authentication server 30 comprises:
- a receiving module 300 designed to receive a connection context request in order to attach the client device 20 to the communication network 1;
- a sending module 302 designed to send a connection context response, the context comprising an identifier of a routing rule management apparatus 50;
- a processing module 304 configured to insert the identifier of the apparatus 50 into a connection context response intended for a client device 20, following reception of a connection context request from this client device.

Figure 6:
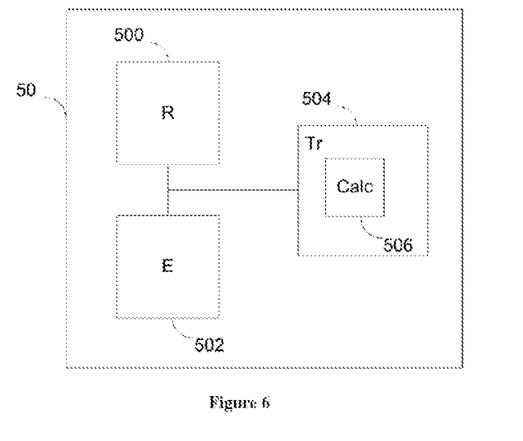
FIG. 6 shows a routing rule management apparatus according to a particular embodiment.

FIG. 6 shows a routing rule management apparatus 50 according to a particular embodiment. The routing rule management apparatus 50 is designed to manage routing rules. It particularly comprises:
- a receiving module 500 designed to receive a request for a policy for routing requests transmitted by a software module 10 running on a client device 20;
- a sending module 502 designed to send the routing policy;
- a processing module 504 designed to generate a routing policy intended to be used by a client device.

In a particular embodiment, the processing module 504 drafts the routing policy from multiple routing rules that it has obtained from various sources, in which case it moreover comprises a computation module 506 designed to combine the routing rules obtained in this manner in order to draft the routing policy and a memory designed to store the routing rules obtained and the routing policy.

The invention is implemented by means of software and/or hardware components. With this in mind, the term "module" may correspond, in this document, either to a software component or to a hardware component, or to a set of hardware and/or software components, which is capable of implementing a function or a set of functions, according to what is described above for the module in question.

A software component corresponds to one or more computer programs, one or more subroutines of a program or, more generally, to any element of a program or of a piece of software. Such a software component is stored in memory and then loaded and executed by a data processor of a physical entity and is capable of accessing hardware resources of this physical entity (memories, recording media, communication buses, electronic input/output cards, user interfaces, etc.).

In the same way, a hardware component corresponds to any element of a hardware assembly. It may be a programmable or nonprogrammable hardware component, with or without an integrated processor for executing software. By way of example, it is an integrated circuit, a chip card, an electronic card for executing a piece of firmware, etc.

In a particular embodiment, the modules 200, 202, 204, 206, 300, 302, 304, 500, 502, 504 and 506 are designed to implement the obtainment method described above. They are preferably software modules comprising software instructions for executing those of the steps of the obtainment method described above that are implemented by a software module, a client device on which the software module runs and a routing rule management apparatus. The invention therefore also concerns:
- a software module, comprising program code instructions intended to control the execution of the steps of the obtainment method described above when said software module is executed by a client device;
- a program for an authentication server, comprising program code instructions intended to control the execution of the steps of the method for assisting in obtaining a routing policy described above when said program is executed by said server;
- a program for a routing rule management apparatus, comprising program code instructions intended to control the execution of the steps of the method for obtaining a routing policy described above when said program is executed by said apparatus;
- a recording medium readable by a client device on which is recorded the software module for such a client device;
- a recording medium readable by an authentication server on which is recorded the program for such a server;
- a recording medium readable by a routing rule management apparatus on which is recorded the program for such an apparatus.

The software modules can be stored in or transmitted by a data storage medium. This may be a hardware storage medium, for example a CD-ROM, a floppy disk or a hard disk, or else a transmission medium such as an electrical, optical or radio signal, or a telecommunication network.

The invention claimed is:

1. A method for obtaining, in a communication network, a routing policy indicating rules for routing requests transmitted by a software module running on a client device, said method comprising the following processes, implemented during attachment of the client device to the communication network:
  sending, by the client device, to an authentication server of the communication network, a connection context request in order to attach the client device to the communication network;
  receiving, by the client device, from the authentication server, a connection context response, said connection context response comprising an identifier of a routing rule management apparatus storing a routing rule managed by the communication network; and
obtaining, by the software module, the routing policy, from at least one first rule for routing to a proxy apparatus certified by the operator of the communication network, said rule being obtained using the identifier.

2. The method of claim 1, further comprising the following processes implemented by the software module, prior to obtaining said routing policy:
setting up a secure connection to the routing rule management apparatus; and
using the secure connection to receive at least one certificate associated with the routing rule management apparatus;
wherein said first routing rule is determined from at least one resource identifier included in the received certificate.

3. The method of claim 1, further comprising obtaining a second rule for routing to a third-party proxy apparatus, the routing policy being obtained by combining the first and second routing rules.

4. The method of claim 3, wherein the processes of obtaining the second routing rule and combining the first and second routing rules are implemented by the software module running on the client device.

5. The method of claim 4, further comprising, when the first and second routing rules are in conflict, sending a piece of information relating to said conflict to the routing rule management apparatus.

6. The method of claim 3, wherein the processes of obtaining the second routing rule and combining the first and second routing rules are implemented by the routing rule management apparatus.

7. A method for assisting in obtaining a routing policy indicating rules for routing requests transmitted by a software module running on a client device, said method being implemented in a communication network and comprising the following processes, implemented during attachment of the client device to said communication network:
receiving, by an authentication server, from the client device, a connection context request in order to attach the client device to the communication network; and
sending, by an authentication server, to the client device, a connection context response, said connection context response comprising an identifier of a routing rule management apparatus storing a routing rule managed by the communication network.

8. A client device configured to obtain an identifier of a routing rule management apparatus, said client device comprising a processor and a memory, the processor configured to:
send a connection context request to an authentication server in order to attach the client device to a communication network;
receive a connection context response, said connection context response comprising an identifier of a routing rule management apparatus storing a routing rule managed by the communication network; and
obtain a routing policy intended to be used by the client device, using the identifier of the routing rule management apparatus.

9. An authentication server in a communication network, said authentication server being configured to assist a client device in obtaining a routing policy, wherein said authentication server comprises a processor and a memory, the processor configured to:
receive a connection context request in order to attach the client device to the communication network;
send a connection context response, said connection context response comprising an identifier of a routing rule management apparatus storing a routing rule managed by the communication network; and
insert the identifier of the apparatus into a connection context response intended for a client device, following reception of a connection context request from this client device.

10. A system for a routing policy indicating rules for routing requests transmitted by a software module running on a client device, designed to provide said routing policy for the software module, said system comprising:
a client device configured to obtain an identifier of a routing rule management apparatus said client device comprising a processor and a memory, the processor configured to:
send a connection context request to an authentication server in order to attach the client device to a communication network;
receive a connection context response, said connection context response comprising an identifier of a routing rule management apparatus storing a routing rule managed by the communication network; and
obtain a routing policy intended to be used by the client device, using the identifier of the routing rule management apparatus;
said system further comprising the authentication server of claim 9.

11. The system of claim 10, further comprising a routing rule management apparatus designed to manage routing rules, said rule management apparatus comprising a processor and a memory, the processor configured to:
receive a request for a policy for routing requests transmitted by a software module running on a client device;
send the routing policy; and
generate a routing policy intended to be used by a client device.

12. A non-transitory computer readable medium having stored thereon instructions, which when executed by a client device cause said client device to perform a method for obtaining, in a communication network, a routing policy indicating rules for routing requests transmitted by a software module running on said client device, said method comprising the following processes, implemented during attachment of said client device to the communication network:
sending, by the client device, to an authentication server of the communication network, a connection context request in order to attach the client connection context request in order to attach the client device to the communication network;
receiving, by the client device, from the authentication server, a connection context response, said connection context response comprising an identifier of a routing rule management apparatus storing a routing rule managed by the communication network; and
obtaining, by the software module, the routing policy, from at least one first rule for routing to a proxy apparatus certified by the operator of the communication network, said rule being obtained by means of the identifier.

13. A non-transitory computer readable medium having stored thereon instructions, which when executed by an authentication server cause said authentication server to perform a method of controlling the execution of a method for assisting in obtaining a routing policy indicating rules for routing requests transmitted by a software module running on a client device, said method being implemented in a communication network and comprising the following processes, implemented during attachment of the client device to said communication network:

receiving, by an authentication server, from the client device, a connection context request in order to attach the client device to the communication network; and sending, by an authentication server, to the client device, a connection context response, said connection context response comprising an identifier of a routing rule management apparatus storing a routing rule managed by the communication network.

14. A client device comprising a processor and the non-transitory computer readable medium of claim 12.

* * * * *